United States Patent [19]

Michioka et al.

[11] Patent Number: 5,308,295
[45] Date of Patent: May 3, 1994

[54] PLANETARY GEAR SYSTEM FOR AUTOMATIC TRANSMISSION

[75] Inventors: Hirofumi Michioka; Yuji Hayashi; Koichi Hayasaki, all of Kanagawa, Japan

[73] Assignee: Nissan Motor Co., Ltd., Washington, D.C.

[21] Appl. No.: 917,334

[22] Filed: Jul. 23, 1992

[30] Foreign Application Priority Data

Jul. 26, 1991 [JP] Japan ................... 3-208858

[51] Int. Cl.⁵ .................................... F16H 59/00
[52] U.S. Cl. ...................... 475/275; 475/286
[58] Field of Search ........... 475/258, 262, 269, 271, 475/275, 279, 286, 290, 317, 323

[56] References Cited

U.S. PATENT DOCUMENTS

| | | | |
|---|---|---|---|
| 3,067,632 | 12/1962 | Foerster et al. | 475/59 |
| 3,941,013 | 3/1976 | Miller | 475/282 X |
| 3,996,817 | 12/1976 | Winzeler | 475/286 X |
| 4,070,927 | 1/1978 | Polak | 475/286 |
| 4,509,389 | 4/1985 | Vahratian et al. | 475/276 X |
| 4,683,776 | 8/1987 | Klemen | 475/286 |
| 4,935,872 | 6/1990 | Benford et al. | 364/424.1 |
| 5,055,098 | 10/1991 | Umebayashi et al. | 475/59 X |

FOREIGN PATENT DOCUMENTS

| | | | |
|---|---|---|---|
| 61-45144 | 3/1986 | Japan | 475/269 |
| 63-235728 | 9/1988 | Japan | |
| 1-80853 | 5/1989 | Japan | |

OTHER PUBLICATIONS

Nissan Repair Manual (L4N71B and E4N71B), 1982, p. 7.
Toyota Repair Manual (A340E), 1985.
Toyota Repair Manual (A540H).
Jaguar XJ6 Repair Manual (ZF4HP-22), pp. 44-2.
"Nissan Repair Manual, Nissan Automatic Transaxle RL4F03A Type", p. A-2, May 1989.

Primary Examiner—Leslie A. Braun
Assistant Examiner—Khoi Q. Ta
Attorney, Agent, or Firm—Foley & Lardner

[57] ABSTRACT

An automatic transmission includes first and second planetary gear sets, and a third planetary gear set which is closer to an output end of the transmission, and which is smaller in diameter than the first and second gear sets. One brake is disposed around the first and second planetary gear sets, and another brake has a pack of brake plates surrounding the smaller third planetary gear set. A transmission case is therefore made gradually smaller toward the output end. This planetary gear system makes it possible to arrange the brakes very compactly, and the tapered transmission case improves the rigidity of the automatic transmission.

8 Claims, 4 Drawing Sheets

FIG.4

| SPEEDS | ENGAGING DEVICES | | | | |
|---|---|---|---|---|---|
| | $C_1$ | $C_2$ | $B_1$ | $B_2$ | $B_3$ |
| 1 | ○ | | | | ○ |
| 2 | ○ | | | ○ | |
| 3 | ○ | | ○ | | |
| 4 | ○ | ○ | | | |
| 5 | | ○ | ○ | | |
| R | | | ○ | | ○ |

PLANETARY GEAR SYSTEM FOR AUTOMATIC TRANSMISSION

BACKGROUND OF THE INVENTION

The present invention relates to a planetary gear system of an automatic transmission.

A Japanese Utility Model Provisional Publication No. 1-80853 shows an automatic transmission having three planetary gear sets. These three planetary gear sets are almost equal in diametral size, and accordingly the transmission case enclosing these gear sets is not tapered but cylindrical. Therefore, it is difficult to improve the rigidity of the transmission case, and to arrange brakes compactly around the planetary gear sets.

SUMMARY OF THE INVENTION

It is an object of the present invention to provide a compact structure for an automatic transmission which can reduce the size and weight of the transmission, and improve the rigidity of the transmission.

According to the present invention, an automatic transmission comprises a planetary gear system comprising first, second and third planetary gear sets, and an engaging device group comprising a first holding device. The planetary gear system is disposed between input and output ends of the automatic transmission, and arranged to transmit rotation therebetween. The third planetary gear set is closest to the output end, and smallest in diametral size, of all of the first, second and third planetary gear set. The first holding device is disposed around the smallest third planetary gear set. The device group may further comprises a second holding device surrounding the first and second planetary gear sets.

In one preferred embodiment of the invention, the second planetary gear set is intermediate, in both positional relationship and diametral size, between the first and third planetary gear sets. Each of the first and second holding devices is a multiple disk brakes. The first holding device comprises a pack of friction brake plates surrounding the third planetary gear set, and a brake piston placed around an output shaft. The second holding device comprises a pack of brake plates surrounding the first planetary gear set, and a brake piston surrounding the second planetary gear set. The automatic transmission further comprises a transmission case which encloses the first and second holding devices, and which becomes gradually smaller in cross sectional size toward the output end.

BRIEF DESCRIPTION OF THE DRAWINGS

FIG. 4 is a table showing clutches and brakes to be engaged to obtain five forward speeds and one reverse speed with this automatic transmission.

DETAILED DESCRIPTION OF THE INVENTION

FIGS. 1–4 show an automatic transmission according to one embodiment of the present invention.

Figure 2:
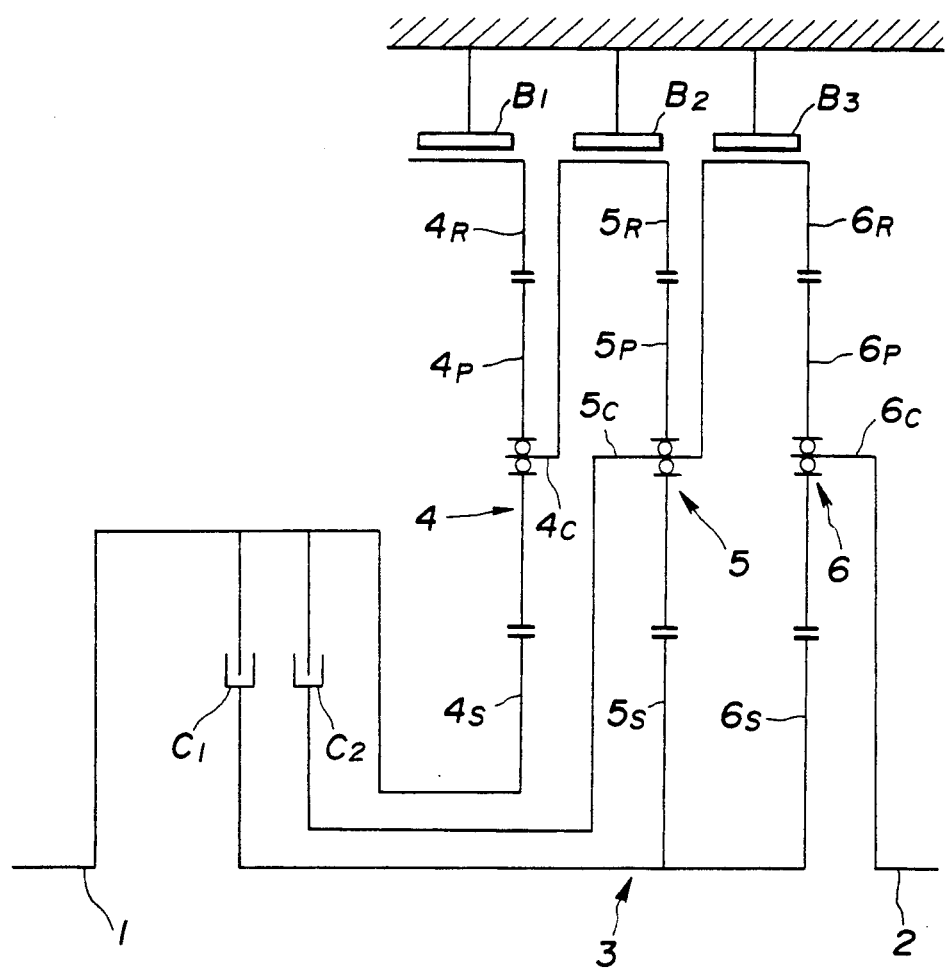
FIG. 2 is a skeleton diagram schematically showing the automatic transmission of this embodiment.

As shown in the skeleton diagram of FIG. 2, the automatic transmission includes an input member 1 in the form of a shaft, an output member 2 also in the form of a shaft, and an intermediate shaft 3. These shafts 1, 2 and 3 are arranged end to end in a straight line, and the intermediate shaft 3 is placed between the input and output shafts 1 and 2. The input shaft 1 has an inner end facing toward the output shaft 2, and an outer end which is more remote from the output shaft 2 than the inner end. The output shaft 2 has an inner end facing toward the input shaft 1, and an outer end which is more remote from the input shaft 1 than the inner end of the output shaft 2. The intermediate shaft 3 has a first end confronting the inner end of the input shaft 1, and a second end confronting the inner end of the output shaft 2.

The automatic transmission further includes a planetary gear system which is arranged between the input and output shafts 1 and 2, and which is coaxial with the input, intermediate and output shafts 1, 3 and 2. In this embodiment, the planetary gear system includes a first planetary gear set 4, a second planetary gear set 5 and a third planetary gear set 6. The planetary gear system is connected between the input and output shafts 1 and 2, to transmit rotation therebetween.

The first planetary gear set 4 includes a first sun gear $4_S$, a first ring gear $4_R$, and a first planet carrier $4_C$ rotatably carrying a set of first pinions $4_P$ each of which is in direct engagement with both of the sun gear $4_S$ and the ring gear $4_R$. Similarly, the second planetary gear set 5 includes a second sun gear $5_S$, a second ring gear $5_R$, and a second planet carrier $5_C$ rotatably carrying second pinions $5_P$. The third planetary gear set 6 includes a third sun gear $6_S$, a third ring gear $6_R$ and a third planet carrier $6_C$ rotatably carrying third pinions $6_P$. In this embodiment, each of the first, second and third planetary gear sets 4, 5 and 6 is a simple planetary gear set of a single pinion type.

The automatic transmission shown in FIG. 2 further includes a selective engaging device group which, in this embodiment, consists of first and second clutches $C_1$ and $C_2$, and first, second and third brakes $B_1$, $B_2$ and $B_3$. The third brake $B_3$ corresponds to a first holding device, and the second brake $B_2$ corresponds to a second holding device.

The first sun gear $4_S$ and the input shaft 1 are connected together so that they always rotate together. The second and third sun gears $5_S$ and $6_S$ are also connected together so as to prevent relative rotation therebetween. The input shaft 1 is connected with the second and third sun gears $5_S$ and $6_S$ through the first clutch $C_1$. The second clutch $C_2$ is connected between the second carrier $5_C$ and the input shaft 1. The second clutch $C_2$ can connect the second carrier $5_C$ and the input shaft 1 together, and disconnect them one from the other. The second carrier $5_C$ and the third ring gear $6_R$ are connected together so that they rotate together. The first brake $B_1$ is connected between the first ring gear $4_R$ and a stationary member. The first brake $B_1$ can hold the first ring gear $4_R$ stationary. The second brake $B_2$ can hold stationary the first carrier $4_C$ and the second ring gear $5_R$ which are connected together. The third brake $B_3$ can hold stationary the second carrier $5_C$ and the third ring gear $6_R$ which are connected together. The third carrier $6_C$ and the output shaft 2 are connected together.

The automatic transmission further includes a shift control system (or shift control means) which is connected with each of the selective engaging devices C₁, C₂, B₁, B₂ and B₃, and arranged to provide first through fifth forward speeds and a reverse speed by engaging and disengaging the selective engaging devices as shown in a table of FIG. 4. In this table, engagement of any of the devices is shown by a small circle. This shift control system obtains each speed by engaging two of the five devices $C_1$, $C_2$, and $B_1$-$B_3$, and holding the remaining three disengaged. Each shift from one speed to the next speed is achieved by bringing one device from the engaged state to the disengaged state and another device from the disengaged state to the engaged state. During this, still another device is kept engaged. To effect an upshift from the first speed to the second speed, for example, the shift control system disengages the third brake $B_3$ and instead engages the second brake $B_2$. The first clutch $C_1$ remains engaged, and needs not be operated.

Figure 3:
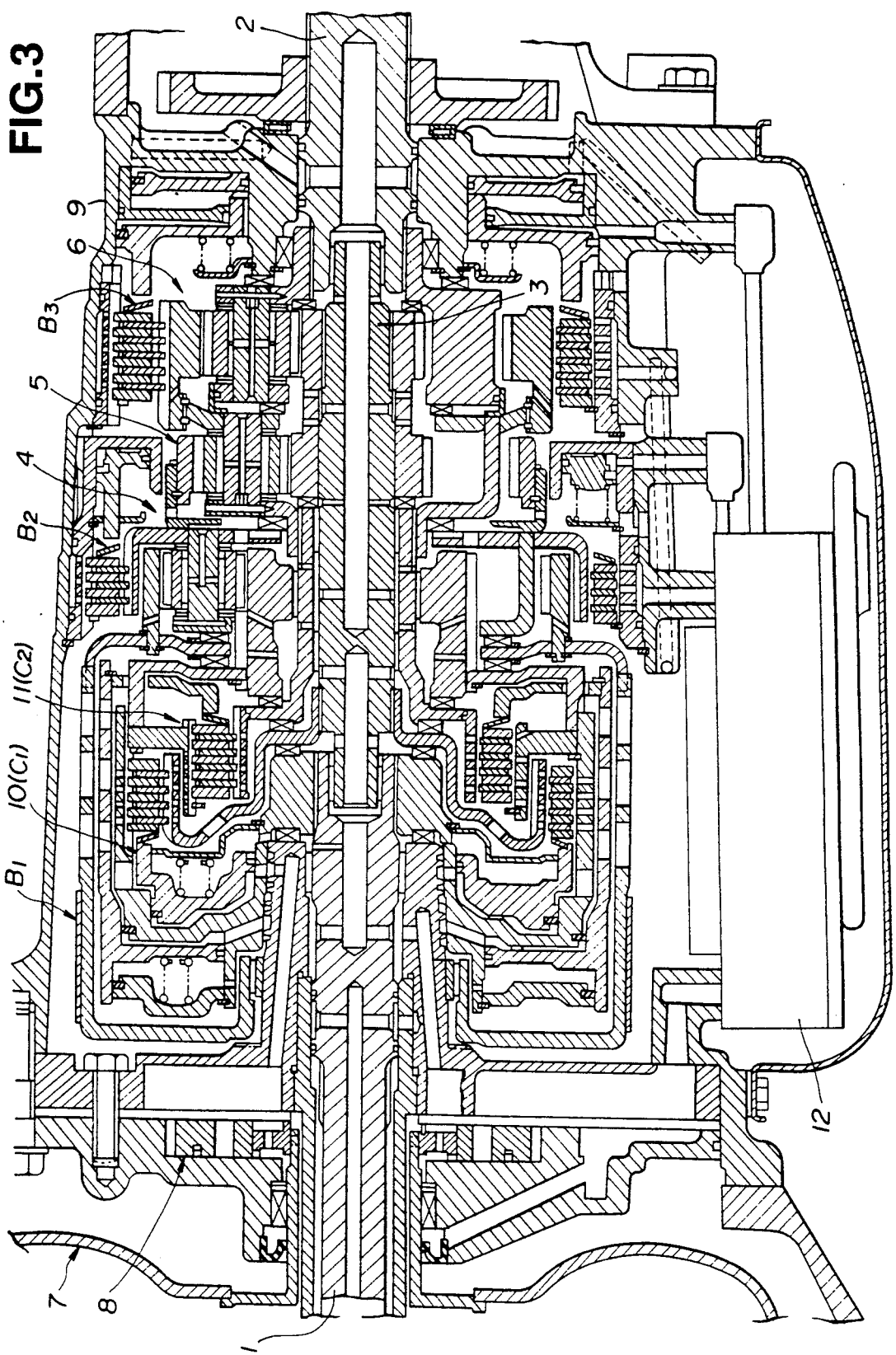
FIG. 3 is a sectional view showing almost the whole of the automatic transmission of this embodiment.

FIG. 3 shows the automatic transmission according to this embodiment of the present invention more concretely. As shown in FIG. 3, the axes of the input shaft 1, the intermediate shaft 3 and the output shaft 2 are all on a common straight line which is a center axis of the transmission. The input shaft 1 extends leftward as viewed in FIG. 3, into a torque converter 7 (FIG. 3 shows only a part of the torque converter 7). The automatic transmission shown in FIG. 2 is combined with the torque converter 7 to form a torque converter automatic transmission. An oil pump 8 is formed around a middle portion of the input shaft 1.

In the example shown in FIG. 3, each of the first and second clutches $C_1$ and $C_2$ are in the form of a multiple disc clutch 10 or 11. The first and second multiple disc clutches 10 and 11, and the first brake (band brake) $B_1$ are all located around the input shaft 1 near the inner end (the right end as viewed in FIG. 3) of the input shaft 1.

The intermediate shaft 3 has the first (left) end which is rotatably supported by the inner (right) end of the input shaft 1, and the second (right) end which is rotatably supported by the inner (left) end of the output shaft 2. The first, second and third planetary gear sets 4, 5 and 6 are arranged around the intermediate shaft 3 between the first and second ends of the intermediate shaft 3. The second planetary gear set 5 is placed axially between the first and third planetary gear sets 4 and 6. The first planetary gear set 4 is axially between the first (left) end of the intermediate shaft 3 and the second planetary gear set 5. The third planetary gear set 6 is axially between the second planetary gear set 5 and the second (right) end of the intermediate shaft 3. The second and third brakes $B_2$ and $B_3$ are arranged around these planetary gear sets. The output shaft 2 extends rightward as viewed in FIG. 3. There are provided, around the output shaft 2, a piston of the third brake $B_3$ and a support wall.

This automatic transmission shown in FIG. 3 further includes a transmission case 9, and a control valve assembly 12 of the shift control system for supplying oil to each of oil passages shown in FIG. 3.

Figure 1:
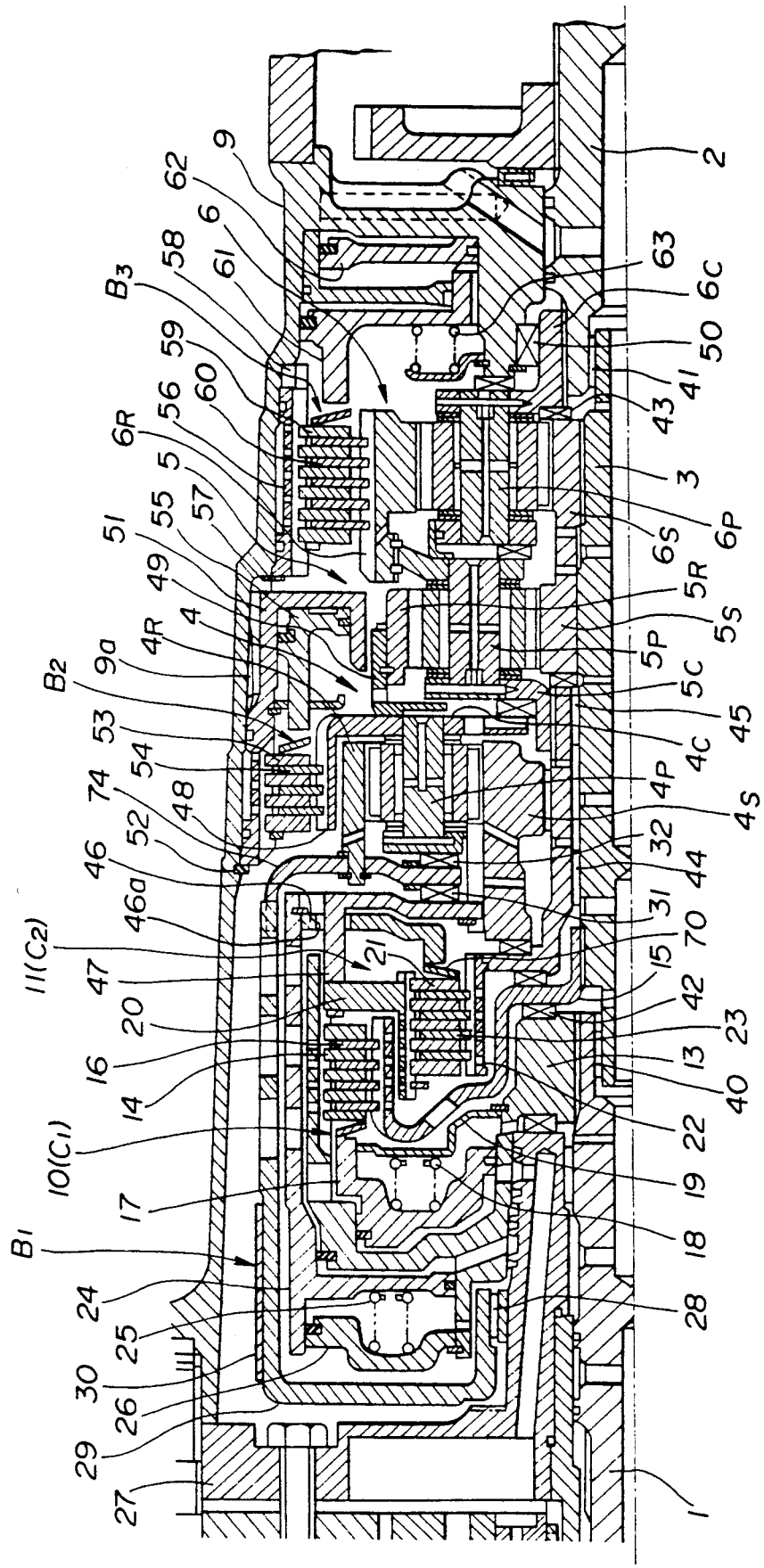
FIG. 1 is a sectional view showing a part of an automatic transmission according to one embodiment of the present invention.

FIG. 1 shows the automatic transmission of FIG. 3 more in detail.

The first multiple disc clutch 10 ($C_1$) includes a first clutch drum 13, and a first clutch pack of first external and internal clutch plates 14 and 16 which are arranged alternately. The first clutch drum 13 is mounted on, and splined (coupled by means of one or more splines) to, the input shaft 1. The first external clutch plates 14 are engaged with the clutch drum 13. The first internal clutch plates 16 are engaged with a first clutch hub 15 which is mounted on, and splined to, the intermediate shaft 3. The first clutch 10 ($C_1$) further includes a first clutch piston 17 for pushing the alternating first clutch pack of the clutch plates in the right direction as viewed in FIG. 1 to engage the first clutch 10 by receiving an oil pressure, a spring 18 for urging the piston 17 in a release (left) direction, and a retainer 19 for supporting the spring 18. The first clutch piston 17 has a pushing portion for pushing the first clutch pack from the left side and a pressure receiving portion for receiving the clutch fluid pressure. The pushing portion, pressure receiving portion and the spring 18 of the first clutch 10 are all located on a first (left) side of the first clutch pack.

The second multiple disc clutch 11 ($C_2$) includes a second clutch drum 20, and a second clutch pack of second external and internal clutch plates 21 and 23. The second clutch drum 20 is received in, and splined to, the first clutch drum 13. The second external clutch plates 21 are engaged with the second clutch drum 20. The second internal clutch plates 23 are engaged with a second clutch hub 22 which is coupled with the second carrier $5_C$ by means of one or more splines. The second clutch 11 ($C_2$) further includes a second clutch piston 24 for pushing the second clutch pack of the clutch plates 21 and 23 in the left direction to engage the second clutch 11 by receiving a fluid pressure, and a spring 25 for urging the second piston 24 in the release (right) direction.

In the automatic transmission according to this embodiment of the invention, the first and second clutches 10 and 11 are arranged radially so that one is surrounded by the other. In the example shown in FIG. 1, the second clutch pack of the second clutch plates 21 and 22 is surrounded by the first clutch pack of the first clutch plates 14 and 16. The first and second clutch packs are placed axially between the pushing portion of the first piston 17 and a pushing portion of the second piston 24. Therefore, the axial dimension of this clutch structure is significantly reduced as compared with a conventional clutch structure in which the first and second clutches are arranged axially. The clutch structure shown in FIG. 1 can reduce the axial size and weight of the automatic transmission. The second clutch drum 20 is splined to the inside surface of the first clutch drum 13, so that this clutch structure can be readily assembled.

The second clutch 11 further includes an end member 26 which supports the spring 25 and defines a centrifugal fluid chamber for producing a centrifugal oil pressure. The second piston 24 has the pushing portion for pushing the second clutch pack from a second (right) side, a cylindrical portion surrounding the first clutch drum 13, and a pressure receiving center portion receiving the clutch fluid pressure. The pushing portion of the second clutch piston 24 is located on the second (right) side of the second clutch pack, and the pressure receiving portion of the second clutch piston 24 is on the first (left) side of the second clutch pack.

The pressure receiving center portion of the second clutch piston 24 extends radially inwardly toward the input shaft 1 from the inside surface of the cylindrical portion, and divides the bore of the cylindrical portion of the second clutch piston 24 into a first (left) bore section and a second (right) bore section. The first clutch drum 13 is received in the second bore section.

The end member 26 is fit in the first bore section to form the centrifugal fluid chamber in the first bore section between the end member 26 and the pressure receiving portion of the second piston 24. Thus, the second clutch piston 24 has a T-shaped section as shown in FIG. 1. The spring 25 is disposed in the centrifugal fluid chamber.

The first brake (band brake) $B_1$ includes a first brake drum 29 and a brake band 30. The first brake drum 29 has a hub portion supported through a bearing 28 by a stationary support wall 27 for supporting the input shaft 1. The first brake drum 29 further has an outer cylindrical portion which surrounds the second clutch piston 24. The brake band 30 is wrapped around the outer cylindrical portion of the first brake drum 29.

In this way, the first and second clutches 10 ($C_1$) and 11 ($C_2$) and the first brake $B_1$ are compactly arranged on the input shaft 1, so that a sufficient space is left for placing the first, second and third planetary gear sets 4, 5 and 6 around the intermediate shaft 3. Three of the five engaging devices $C_1$, $C_2$ and $B_1$-$B_3$ are located around the input shaft 1, and only the remaining two are arranged around the intermediate shaft 3.

The first clutch drum 13 separates a first clutch fluid pressure chamber formed between the first clutch piston 17 and the first clutch drum 13, from a second clutch fluid pressure chamber formed between the second clutch piston 24 and the first clutch drum 13. Both chambers are located on the first (left) side of the first and second clutch packs. When an oil pressure is supplied to the first chamber, then the first piston 17 moves rectilinearly in a first (rightward) direction and compresses the first clutch pack of the first clutch plates 14 and 16. Therefore, the first clutch 10 transmits an input rotation of the input shaft 1 from the first clutch drum 13 to the first clutch hub 15, which drives the intermediate shaft 3 at an input speed of the input shaft 1. When an oil pressure is supplied to the second pressure chamber, the second clutch piston 24 moves in a second (leftward) direction, and compresses the second clutch pack of the second clutch plates 21 and 23. In this case, the input rotation of the input shaft 1 transmitted to the second clutch drum 20 through the first clutch drum 13 is further transmitted to the second clutch hub 22, which drives the second carrier $5_C$ at the input speed.

When the oil pressure is supplied to the second clutch fluid pressure chamber and the second second piston 24 pushes the second clutch pack, the right end of the second piston 24 receives a reaction force which tends to deform the right end of the second piston 24 radially outwardly. This outward force acts as a bending moment, and the left end of the second piston 24 receives a force acting radially inwardly toward the center axis of the transmission. However, the end member 26 and the centrifugal oil pressure in the centrifugal fluid chamber receive this inward force, and prevent the left end of the second piston 24 from being deformed inwardly. Therefore, it is possible to reduce the wall thickness of the second clutch piston 24.

The second clutch piston 24 of this embodiment consists of a main member having the pressure receiving portion and the cylindrical portion surrounding the first clutch drum 13, and a pushing member 46 serving as the pushing portion for pushing the second clutch pack. The pushing member 46 is formed with holes 46a. The holes 46a are arranged in a circle in the manner of radial symmetry. The pushing member 46 has a central portion projecting toward the second clutch pack, and abuts on a dish plate 70 as shown in FIG. 1. The dish plate 70 is disposed between the second clutch pack and the central portion of the pushing member 46.

The structure shown in FIG. 1 further includes a first connecting member 47 which connects the first clutch drum 13 with the first sun gear $4_S$, so that the first sun gear $4_S$ rotates always at the input speed of the input shaft 1. The first connecting member 47 has axially extending arms. Each of the arms is inserted through a unique one of the holes 46a of the pushing member 46, and splined with the first clutch drum 13. The first sun gear $4_S$ has a hub portion which is fit and engaged in a center hole of the first connecting member 47 so that the first sun gear $4_S$ and the first connecting member 47 rotate together. The pushing member 46 is interposed axially between the first clutch drum 13 on the first (left) side, and the first sun gear $4_S$ on the second (right) side. The arms 47a extends axially from the second side toward the first clutch drum 13 through the holes 46a. In this way, the input rotation of the input shaft 1 is transmitted through the first clutch drum 13 and the first connecting member 47 to the first sun gear $4_S$.

The structure shown in FIG. 1 further includes a second connecting member 74 for connecting the first brake drum 29 with the first ring gear $4_R$. The second connecting member 74 has an outer portion having dents which are interdigitated with dents formed in the (right) end of the outer cylindrical portion of the first clutch drum 29. Therefore, rotation is transmitted between the first brake drum 29 and the second connecting member 74, but no radial force acting in a direction perpendicular to the center axis of the transmission (the up-and-down direction as viewed in FIG. 1) is transmitted. The second connecting member 74 has a middle portion which is connected with the first ring gear $4_R$ so as to prevent relative rotation between the second connecting member 74 and the first ring gear $4_R$. The second connecting member 74 has an inner portion which is supported between first and second thrust bearings 31 and 32 which are spaced axially. The first and second thrust bearings 31 and 32 are supported, respectively, by the first connecting member 47 and the first planet carrier $4_C$. The first and second thrust bearings 31 and 32 are located at a radial position closer to the center axis than the radial position of the first ring gear $4_R$. When the first brake B1 is applied, the brake band 30 prevents rotation of the first brake drum 29, and thereby holds stationary the first ring gear $4_R$ which is connected with the first brake drum 29 so as to prevent relative rotation therebetween by the second connecting member 74.

First and second bearing 40 and 41 are provided on both ends of the intermediate shaft 3, as shown in FIG. 1. The first bearing 40 is interposed between the first (left) end of the intermediate shaft 3 and the inner (right) and of the input shaft 1. The first end of the intermediate shaft 3 is supported by the inner end of the input shaft 1 through the first bearing 40. Similarly, the second end of the intermediate shaft 3 is supported by the inner end of the output shaft 21 through the second bearing 41.

As shown in FIG. 1, the first clutch hub 15 has an inner end which is mounted on, and splined to, the intermediate shaft 3 near the first end of the intermediate shaft 3. A first (left) portion of the intermediate shaft 3 near the first end is supported by the first clutch hub member 15, and further through a bearing 42 by the first clutch drum 13 on the input shaft 1. A second (right)

portion of the intermediate shaft 3 near the second end is supported by the third sun gear $6_S$, and through a bearing 43 by the third carrier $6_C$ on the output shaft 2. The second clutch hub member 22 is coupled with the second carrier $5_C$ by means of one or more splines. The second clutch hub member 22 is rotatably mounted on the intermediate shaft 3 through bearings 44 and 45. The third sun gear $6_S$ is mounted on, and coupled with the intermediate shaft 3 by means of one or more splines. The second and third sun gears $5_S$ and $6_S$ are connected together to form a single rotary member. Therefore, the second and third sun gears $5_S$ and $6_S$ rotate together with the intermediate shaft 3.

The second brake $B_2$ includes a brake hub 48 which is connected with the first carrier $4_C$, which is further connected with the second ring gear $5_R$ by a connecting member 49. The second planet carrier $5_C$ has a left end splined to the second clutch hub member 22, and a right end connected with the third ring gear $6_R$. The ring gear $6_R$ has an outer portion serving as a brake hub of the third brake $B_3$. The third planet carrier $6_C$ is mounted on, and splined to, the output shaft 2, which is in turn supported on the transmission case 9 through a bearing 50.

The second brake $B_2$ (corresponding to the second holding device) includes a brake drum 51 which is fit in the transmission case 9 and which surrounds the first and second planetary gear sets 4 and 5. The brake drum 51 is fixed to the transmission case 9 by a snap ring 52 and teeth 9a formed on the inside surface of the transmission case 9. The second brake $B_2$ further includes an alternating pack of external brake plates 53 engaged with the brake drum 51, and internal brake plates 54 engaged with the brake hub 48. The second brake $B_2$ further includes a brake piston 55 which is slidably received in the brake drum 51. The second brake $B_2$ is applied when the brake piston 55 moves leftwards as viewed in FIG. 1 against the force of a return spring (not shown) by the action of a fluid pressure.

The third brake $B_3$ (corresponding to the first holding device) includes a brake drum 56, and an alternating pack of external brake plates 59 engaged with the brake drum 56 and internal brake plates 60 engaged with the third ring gear $6_R$ serving as a brake hub. The brake drum 56 surrounds the third planetary gear set 6, and is fit in the transmission case 9. The brake drum 56 is fixed to the transmission case 9 by a snap ring 57 and a member 58 for preventing rotation. The third brake $B_3$ further includes a double piston structure including pistons 61 and 62. The pistons 61 and 62 are separated from the brake drum 56, and slidably received in a piston chamber formed in the transmission case 9, around the left end portion of the output shaft 2. The pistons 61 and 62 move leftwards in FIG. 1 by the action of a fluid pressure against the force of a spring 63 when the third brake $B_3$ is applied. It is possible to employ such a double piston structure because the third brake $B_3$ is located at one end of the planetary gear train. This double piston structure provides a large clutch capacity, and enables reduction of the number of the brake plates.

In the planetary gear system according to this embodiment, the third planetary gear set 6 which is closest to the output shaft 2 is smallest in diametral size among the three planetary gear sets 4, 5 and 6. In general, the gear size of a planetary gear set is measured in terms of the engaging position of the teeth of the ring gear, without regard to the thickness of the ring gear (or the outside diameter of the ring gear). In other words, the diameter of the pitch circle of the third ring gear $6_R$ is smaller than that of either one of the first and second ring gears. Therefore, the (third) pitch diameter of the third ring gear $6_R$ is smaller than the (first) pitch diameter of the first right gear $4_R$, and smaller than the (second) pitch diameter of the second ring gear $5_R$. Therefore, the planetary gear system offers the following advantages.

First, the transmission case 9 is tapered along the axis, as shown in FIG. 1. This conical shape of the transmission case 9 increases its own rigidity, and the rigidity of the automatic transmission as a whole. In this embodiment, the second brake $B_2$ is disposed around the first and second planetary gear sets 4 and 5. The brake plates 59 and 60 and the brake drum 56 of the third brake $B_3$ are disposed around the smallest third planetary gear set 6. The transmission case 9 becomes smaller toward the right end as viewed in FIG. 1. Second, the arrangement of the third planetary gear set 6 and the surrounding parts is very compact, and light in weight. The lightweight and rigid structure mitigates the load on a joint portion of an engine's side housing supporting the transmission case 9, and is advantageous in transmission of vibrations. Third, it is possible to increase the capacity of the third brake $B_3$ disposed around the small third planetary gear set 6. In the illustrated embodiment, the brake plates and the brake drum of the third brake $B_3$ are disposed around the third planetary gear set 6, and the brake pistons of the third brake $B_3$ are disposed outside the axial range of the planetary gear system. Therefore, it is easy to increase the capacity of the third brake $B_3$.

Furthermore, the second planetary gear set 5 is smaller in diametral size than the first planetary gear set 4 which is closest to the input shaft 1. The (second) pitch diameter of the second ring gear $5_R$ is smaller than the (first) pitch diameter of the first ring gear $4_R$. This design offers the following advantages. First, it is possible to dispose the large brake piston 55 around the smaller second planetary gear set 5. In the illustrated embodiment, the brake plates 53 and 54 are disposed around the larger first planetary gear set 4, and the brake piston 55 is disposed around the smaller second planetary gear set 5. The radial distance between the transmission case 9 and the second planetary gear set 5 can be made greater than the radial distance between the transmission case 9 and the first planetary gear set 4. Therefore, the radial dimension of the piston 55 can be made greater than that of the brake plates 53 and 54. Therefore, it is possible to increase the cross sectional area (capacity) of the piston 55 without increasing the axial dimension of the piston 55 and without increasing the diameter of the transmission case 9. As a result, the automatic transmission becomes compact in the axial direction and light in weight. Second, it is possible to decrease the number of brake plates because the larger piston 55 can produce a great pushing force. Therefore, it is possible to further reduce the axial size of the second brake $B_2$. Third, the second brake $B_2$ is sufficiently lubricated by flows of a lubricating oil for lubricating the first and second planetary gear sets 4 and 5. The oil is supplied to the second brake $B_2$ from the outer peripheries of the planetary gear sets 4 and 5. The oil flow from the second planetary gear set 5 reaches the brake plates 53 and 54 through the piston 55. This structure, therefore, can improve the heat resistance, and reduce the number of the brake plates. The radial dimensions of the annular brake plates 53 and 54 are relatively small.

However, the area of the annulus of each brake plate is sufficiently large because the inner and outer diameters are both large.

The transmission case 9 shown in FIG. 1 has a first case portion surrounding the pack of the brake plates 53 and 54 of the second brake $B_2$, a second case portion surrounding the brake piston 55 of the second brake $B_2$, a third case portion surrounding the pack of the brake plates 59 and 60 of the third brake $B_3$, and a fourth case portion surrounding the brake pistons 61 and 62 of the third brake $B_3$. The diameters of the first, second, third and fourth case portions are gradually decreased in a stepwise manner toward the right end as viewed in FIG. 1.

In the automatic transmission shown in FIG. 1, it is possible to regard the outer (left) end of the input shaft 1 as an input end of the transmission, and the outer (right) end of the output shaft 2 as an output end of the transmission.

What is claimed is:

1. An automatic transmission comprising:
  a planetary gear system disposed between an input end and an output end of said automatic transmission, said planetary gear system comprises first, second and third planetary gear sets, said third planetary gear set being closer than said second and third planetary gear sets to said output end and being smaller in diametral size than a diametral size of said first and second planetary gear sets;
  an engaging device group comprising a first holding device surrounding said third planetary gear set;
  wherein
  said first, second and third planetary gear sets are coaxially arranged around a common center axis extending from said input end to said output end of said automatic transmission, said second planetary gear set is located axially between said first and third planetary gear sets, said first planetary gear set is located axially between said input end and said second planetary gear set, said third planetary gear set is located axially between said second planetary gear set and said output end, said first planetary gear set comprises a first ring gear having a first pitch diameter, said second planetary gear set comprises a second ring gear having a second pitch diameter, said third planetary gear set comprises a third ring gear having a third pitch diameter which is smaller than said first pitch diameter, and smaller than said second pitch diameter, and said first holding device comprises a pack of friction brake plates surrounding said third ring gear;
  said automatic transmission further comprises input and output shafts which are aligned on said common center axis, each of said input and output shaft comprises inner and outer shaft ends, said inner ends of said input and output shafts confronting each other and located axially between said outer ends of said input and output shafts, said first planetary gear set further comprises a first sun gear located axially between said outer end of said input shaft and said second planetary gear set, said second planetary gear set further comprises a second sun gear located axially between said first sun gear and said third planetary gear set, and said third planetary gear set further comprises a third sun gear located axially between said second sun gear and said outer end of said output shaft, and wherein said device group further comprises a second holding device surrounding said first and second ring gears;
  said first holding device further comprises a brake piston which is disposed around said output shaft and which comprises a circular inner periphery having a diameter which is smaller than said third pitch diameter;
  said second pitch diameter of said second ring gear is smaller than said first pitch diameter of said first ring gear, and said second holding device comprises a pack of friction brake plates disposed around said first ring gear and a brake piston disposed around said second ring gear;
  said automatic transmission further comprises a transmission case comprising a first portion enclosing said second holding device, and a second portion which encloses said first holding device, said second portion being smaller in diameter than said first portion; and
  said first portion of said transmission case comprises a first case section surrounding the pack of said brake plates of said second holding device, and a second case section surrounding said brake piston of said second holding device, and said second portion of said transmission case comprises a third case section surrounding the pack of said brake plates of said first holding device, and a fourth case section surrounding said brake piston of said first holding device, said second case section being smaller in cross sectional size than said first case section, said third case section being smaller in cross sectional size than said second case section, said fourth case section being smaller in cross sectional size than said third case section.

2. An automatic transmission comprising:
  a planetary gear system disposed between an input end and an output end of said automatic transmission, said planetary gear system comprises first, second and third planetary gear sets, said third planetary gear set being closer than said second and third planetary gear sets to said output end and being smaller in diametral size than a diametral size of said first and second planetary gear sets;
  an engaging device group comprising a first holding device surrounding said third planetary gear set;
  wherein
  said first, second and third planetary gear sets are coaxially arranged around a common center axis extending from said input end to said output end of said automatic transmission, said second planetary gear set is located axially between said first and third planetary gear sets, said first planetary gear set is located axially between said input end and said second planetary gear set, said third planetary gear set is located axially between said second planetary gear set and said output end, said first planetary gear set comprises a first ring gear having a first pitch diameter, said second planetary gear set comprises a second ring gear having a second pitch diameter, said third planetary gear set comprises a third ring gear having a third pitch diameter which is smaller than said first pitch diameter, and smaller than said second pitch diameter, and said first holding device comprises a pack of friction brake plates surrounding said third ring gear;

said automatic transmission further comprises input and output shafts which are aligned on said common center axis, each of said input and output shaft comprises inner and outer shaft ends, said inner ends of said input and output shafts confronting each other and located axially between said outer ends of said input and output shafts, said first planetary gear set further comprises a first sun gear located axially between said outer end of said input shaft and said second planetary gear set, said second planetary gear set further comprises a second sun gear located axially between said first sun gear and said third planetary gear set, and said third planetary gear set further comprises a third sun gear located axially between said second sun gear and said outer end of said output shaft, and wherein said device group further comprises a second holding device surrounding said first and second ring gears;

said first holding device further comprises a brake piston which is disposed around said output shaft and which comprises a circular inner periphery having a diameter which is smaller than said third pitch diameter;

said second pitch diameter of said second ring gear is smaller than said first pitch diameter of said first ring gear, and said second holding device comprises a pack of friction brake plates disposed around said first ring gear and a brake piston disposed around said second ring gear;

said automatic transmission further comprises a transmission case comprising a first portion enclosing said second holding device, and a second portion which encloses said first holding device, said second portion being smaller in diameter than said first portion;

said first planetary gear set further comprises a first planet carrier connected with said second ring gear, said second planetary gear set further comprises a second planet carrier connected with said third ring gear, and said third planetary gear set further comprises a third planet carrier connected with said output shaft, and wherein said device group further comprises a first clutch for connecting said input shaft with said second and third sun gears, a second clutch for connecting said input shaft with said second carrier and said third ring gear, and a first brake for holding said first ring gear, said second holding device being a second brake for holding said first carrier and said second ring gear, said first holding device being a third brake for holding said second carrier and said third ring gear; and said first portion of said transmission case comprises a first case section surrounding the pack of said brake plates of said second holding device, and a second case section surrounding said brake piston of said second holding device, and said second portion of said transmission case comprises a third case section surrounding the pack of said brake plates of said first holding device, and a fourth case section surrounding said brake piston of said first holding device, said second case section being smaller in cross sectional size than said first case section, said third case section being smaller in cross sectional size than said second case section, said fourth case section being smaller in cross sectional size than said third case section.

3. An automatic transmission comprising:

input and output shafts which are aligned with each other, said input shaft extending from an outer end thereof to an inner end thereof toward said output shaft, said output shaft extending from an outer end thereof to an inner end thereof toward said input shaft, said inner ends of said input and output shafts being located axially between said outer ends of said input and output shafts;

a planetary gear system which is connected between said input and output shafts, and which comprises first, second and third planetary gear sets, said second planetary gear set being disposed axially between said first and third planetary gear sets, said first planetary gear set being disposed axially between said outer end of said input shaft and said second planetary gear set, said third planetary gear set being disposed axially between said second planetary gear set and said outer end of said output shaft, said first planetary gear set comprising a first ring gear having a first pitch diameter, said second planetary gear set comprising a second ring gear having a second pitch diameter, said third planetary gear set comprising a third ring gear having a third pitch diameter which is smaller than said first and second pitch diameters;

a transmission case enclosing said planetary gear system; and an engaging device group comprising a first holding device having a pack of brake plates which surrounds said third ring gear and which is disposed in a space formed radially between said third ring gear and said transmission case, a brake piston which is mounted on said output shaft and which is disposed in a space formed radially between said output shaft and said transmission case, and a second holding device having a first portion which surrounds said first ring gear and which is disposed in a space formed radially between said first ring gear and said transmission case and a second portion which surrounds said second ring gear and which is disposed in a space formed radially between said second ring gear and said transmission case.

4. An automatic transmission according to claim 3, wherein said first, second and third planetary gear sets are connected to each other such that at least one rotating element of said first planetary gear set is connected with one rotating element of said second planetary gear set and at least one rotating element of said second planetary gear set is connected with one rotating element of said third planetary gear set, and said first, second and third planetary gear sets are axially arranged so that said first, second and third planetary gear sets are axially located proximate to each other; and wherein said transmission case comprises a first case section surrounding said first ring gear and said first portion of said second holding device, a second case section surrounding said second ring gear and said second portion of said second holding device, a third case section surrounding said third ring gear and said pack of the brake plates of said first holding device, and a fourth case section surrounding said brake piston of said first holding device, said second case section being smaller in cross sectional size than said first case section, said third case section being smaller in cross section than said second case section, said fourth case section being smaller in cross sectional size than said third case section.

5. An automatic transmission according to claim 3 wherein said second pitch diameter of said second ring gear is smaller than said first pitch diameter of said first ring gear, said first portion of said second holding device comprises a pack of brake plates surrounding said first ring gear, and said second portion of said second holding device comprises a brake piston surrounding said second ring gear.

6. An automatic transmission according to claim 5 wherein said engaging device group further comprises a first brake for holding said first ring gear, said second holding device is a second brake for holding said second ring gear, said first holding device is a third brake for holding said third ring gear, and said first brake is placed axially between said outer end of said input shaft and said first planetary gear set so that said first brake is axially spaced from said first planetary gear set.

7. An automatic transmission according to claim 6 wherein said first planetary gear set further comprises a first planet carrier which is connected with said second ring gear so that said first planet carrier and said second ring gear rotate together, and said second planetary gear set further comprises a second planet carrier which is connected with said third ring gear so that said second planet carrier and said third ring gear rotate together.

8. An automatic transmission according to claim 7 wherein said first planetary gear set further comprises a first sun gear connected with said input shaft, said second planetary gear set further comprises a second sun gear, said third planetary gear set further comprises a third sun gear connected with said second sun gear and a third planet carrier connected with said output shaft, and said engaging device group further comprises a first clutch for connecting said input shaft with said second and third sun gears, and a second clutch for connecting said input shaft with said second carrier and said third ring gear, and wherein said first and second clutches are placed axially between said outer end of said input shaft and said first planetary gear set so that each of said first and second clutches is axially spaced from said first planetary gear set.

* * * * *